C. H. WOODS.
FARE COLLECTING APPARATUS.
APPLICATION FILED NOV. 13, 1916.

1,280,351.

Patented Oct. 1, 1918.
2 SHEETS—SHEET 1.

Witness
Chas. L. Griesbauer

Inventor
Charles H. Woods,
By La Porte, Bean & Graham
Attorneys

C. H. WOODS.
FARE COLLECTING APPARATUS.
APPLICATION FILED NOV. 13, 1916.
1,280,351.
Patented Oct. 1, 1918.
2 SHEETS—SHEET 2.
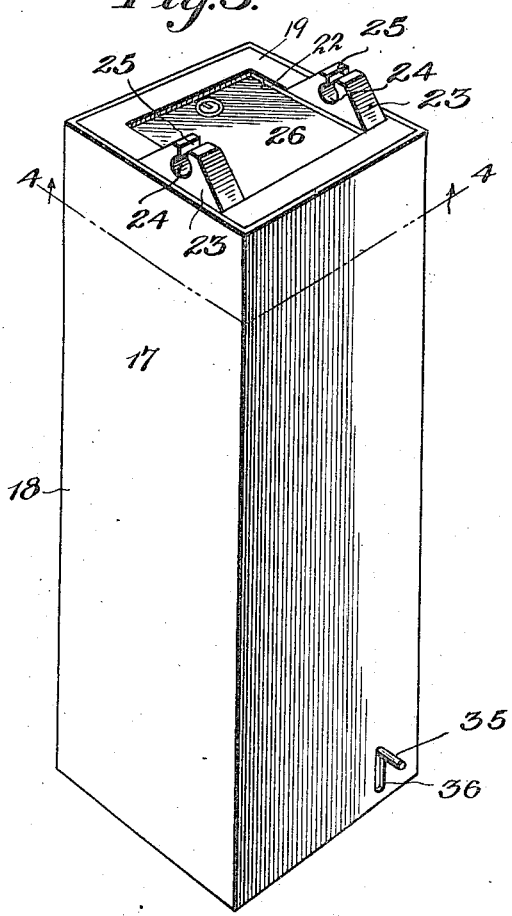
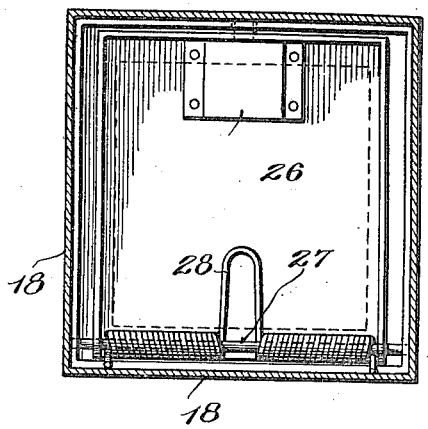
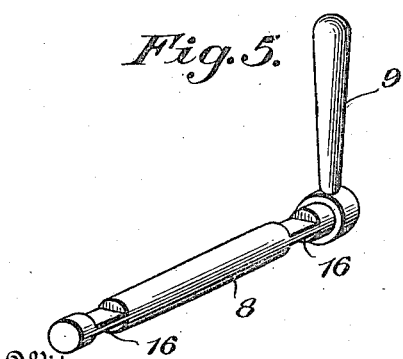
Witness
Chas. L. Griesbauer
Inventor
Charles H. Woods,
By La Porte, Bean & Graham
Attorney

UNITED STATES PATENT OFFICE.

CHARLES H. WOODS, OF DECATUR, ILLINOIS, ASSIGNOR OF ONE-HALF TO MERRILL L. HARRY, OF DECATUR, ILLINOIS.

FARE-COLLECTING APPARATUS.

1,280,351.           Specification of Letters Patent.          Patented Oct. 1, 1918.

Application filed November 13, 1916. Serial No. 131,137.

*To all whom it may concern:*

Be it known that I, CHARLES H. WOODS, a resident of Decatur, in the county of Macon and State of Illinois, have invented certain new and useful Improvements in Fare-Collecting Apparatus, of which the following is a specification.

My invention relates to improvements in coin, ticket or fare collecting device and the principal object is the provision in such a device of a removable receptacle or till having means for automatically locking the same before its removal from the casing and so arranged as to insure that all articles deposited pass into the receptacle or till before its removal.

Another object of this invention is the provision in such a device of a removable receptacle, the lid of which automatically locks at the beginning of the removal thereof and which cannot be removed until the dumping plate is tilted to discharge any articles that may rest or drop thereon.

A further object of this invention is the provision of such a device having a bail for convenient carrying, a simple and effective locking means for holding the removable article receptacle or till within the casing, automatic means for locking the lid of the receptacle or till during the initial part of its withdrawal movement so as to prevent unauthorized access thereto and arranged so that the dumping plate must be held in tilted position before the receptacle or till can be removed so as to insure that all articles deposited pass into the receptacle or till before its removal.

Other objects include improvements in details of construction and arrangement whereby a simple and effective device of this character is provided.

To the accomplishment of the foregoing and such other objects as may hereinafter appear, my invention consists in the construction, combination and arrangement of parts hereinafter described and then sought to be defined in the claims reference being made to the drawings forming a part hereof and which show a preferred embodiment of my invention, it being expressly understood however that this showing is for illustrative purposes only and that various changes may be made in practice within the scope of the claims without digressing from my inventive idea.

Fig. 3 is a perspective view of the fare-receiving till or receptacle *per se;*

Fig. 4 is a cross sectional view thereof on line 4—4 looking upwardly; and

Fig. 5 is a perspective view of the dumping plate shaft.

Figure 1:
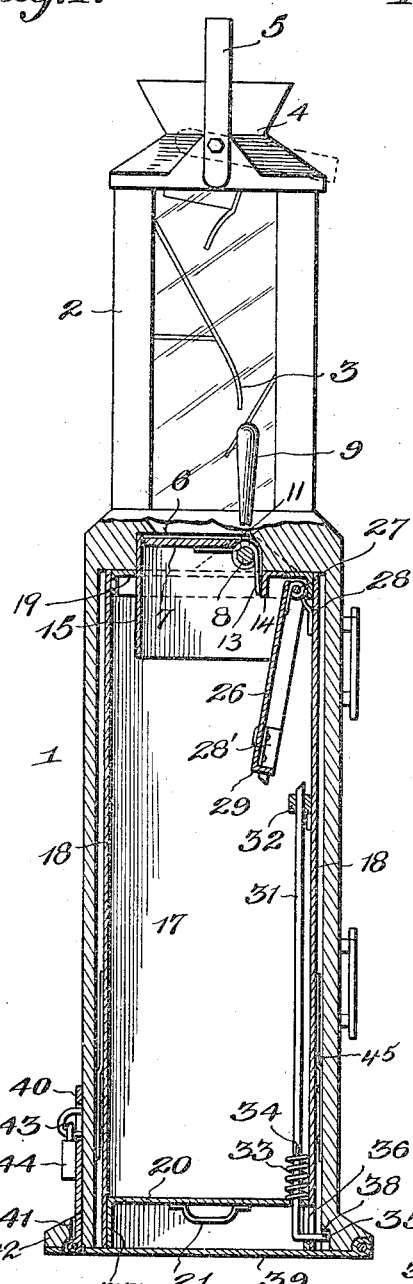
Figure 1 is a side elevation of a fare-collecting apparatus showing the embodied present invention in vertical section.
Figure 2:
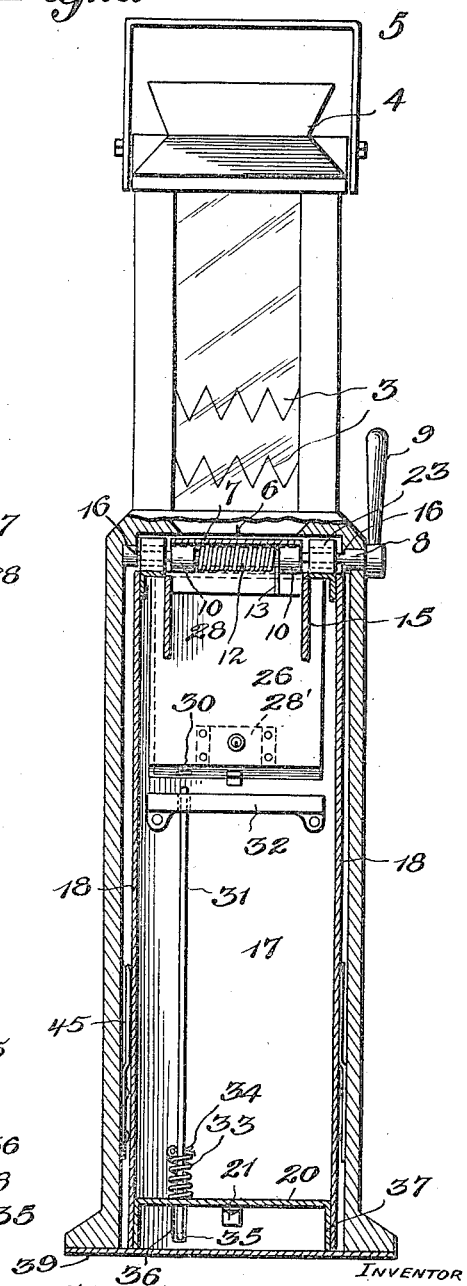
Fig. 2 is a front elevation thereof also having its lower part shown in vertical section to further illustrate the improved structure.

Referring now to the drawing, the numeral 1 designates the main casing or body of the device having the usual transparent hopper 2 with baffle plates 3, the hopper having the usual receiving member or receptacle 4 to which is pivotally connected the bail 5 for convenient carrying and manipulation.

The transparent hopper 2 discharges into the opening 6 in the top of the main casing or body. This opening is normally closed from below by the dumping plate 7 which is mounted on shaft 8 journaled in the upper part of the main casing or body and having the operating handle 9 on the outside thereof. This shaft passes through ears 10 on said plate 7, the hinged end 11 of which is curved to fit against the under side of the top of the main casing or body at all times during its tilting movement. The plate 7 is normally held in closed position by coiled springs 12 about said shaft 8 engaging the underside of the plate and having their free ends 13 engaging the depending flange member 14. The top of the main casing or body has the plate members 15 depending from the inside thereof about three of the sides of opening 6, there being no plate member on the hinge side of the opening. The shaft 8 passes through the opposed pair of these plate members 15, which are spaced from the sides of the main body or casing and has reduced or squared portions 16 between the sides of the main body or casing and the plate members 15, the purpose of which will be described later.

The article receiving receptacle or till 17 is removably mounted within the main casing or body and comprises the side members 18, top member 19 and bottom member 20 having the handle 21 for convenience in withdrawing. The top member 19 is formed with the opening 22 and has the ears 23 on each side thereof. These ears 23 have the aperture 24 therein having the restricted slot 25 leading thereinto. The slots 25 are wide enough to receive the squared portions of shaft 8 but not the round portion or full diameter thereof, while the apertures 24 are of sufficient size to receive the full diameter of shaft 8. It is obvious therefore, that when the square portions of shaft 8 extend downwardly, which occurs when the dumping plate is tilted, the receptacle or till 17 may be pushed upwardly so as to cause the ears 23 to embrace the shaft 8 and when the handle 9 is released the dumping plate is moved to its normal position by the springs and the shaft 8 rotates and is locked within the ears 23 on the top portion of the receptacle or till 17, so as to prevent its removal unless the dumping plate is in a tilted position so as to insure the passage of all articles into the receptacle or till before its removal.

The opening 22 in the top of the receptacle or till is closed by the lid member 26 which is mounted on rod or shaft 27 and held normally closed by coiled springs 28 having a spring or other lock 28'. The lower end of this lid is formed with a flange 29 having aperture 30, therethrough, which is adapted to receive the end of locking rod 31, which is slidably mounted in the bearing bar 32 and in the bottom of the receptacle or till, being normally held in its upper position by spring 33 engaging cotter pin 34 and the bottom of the receptacle or till. The end of the locking rod is bent at an angle, as at 35, this lateral extension working in the slot 36 in the bottom edge flange 37 of the receptacle or till and extending there-beyond so as to engage the inner bottom edge flange 38 of the main casing or body, when being moved into position. When the lid 26 is depressed the rod 31 in being slightly withdrawn will spring into the locking aperture 29 in the lid and hold it in extreme open position.

The bottom of the main casing or body is closed by the door 39 having the hasp 40 passing through slot 41 in the outer bottom edge flange 42 of the main casing or body and engaging keeper 43 which is adapted to receive lock 44. The inside of the main casing or body is provided with a plurality of flat spring binding members 45.

Before the article receiving receptacle or till is placed within the main casing or body, the lid 26 is depressed and held in position by the locking rod 31. When the receptacle or till is pushed into the casing or body, the shaft 8 must be turned until the square portions extend downwardly, before the receptacle or till can be moved to its final position, and then the release of the handle locks it in position. During the last part of this movement, the bottom edge of one of the inner flanges 38 engages the lateral extension 35 of the rod 31 withdrawing it from the aperture 30, so that the lid 26 is released, springs 28 forcing it upwardly or rather about its pivot until it engages the edges of the side flange members 15 which extend down into the receptacle or till 17 and forming then the fourth side of the chute. The door 39 is then closed and locked.

When it is necessary to empty the article receiving receptacle or till 17, the bottom door is unlocked and opened, the rod or shaft 8 turned by its handle so that the squared portions extend downwardly and the dumping plate is tilted to discharge any articles thereon into the receptacle or till. By pulling on handle 21, the receptacle or till may be withdrawn and during the initial part of this movement and as soon as the top end of the receptacle or till passes the lower edges of flange members 15, the lid 26 springs shut and is locked, whereby unauthorized access is prevented.

While the device I disclose is particularly adapted for use as a fare collecting box for street cars and the like, it is obvious that it may be just as readily used for collecting coins, checks or other articles whenever desired. It is simple, efficient and effective, insuring the dumping of all the articles before the removal of the receptacle or till and positively and automatically locking it before its complete withdrawal from the main casing.

What I claim is:—

1. A mechanism of the character described including in combination a main casing, or body having an opening in the upper end thereof, a hopper to discharge articles into said opening, an article receptacle removably mounted in said casing or body, a dumping plate normally closing said opening and means connecting with the dumping plate upon the positioning of the receptacle within the casing for preventing the removal of said receptacle while said plate is in other than a dumping position.

2. A mechanism of the character described including in combination a main casing or body having an opening in the upper end thereof, a hopper to discharge articles into said opening, an article receptacle removably mounted in said casing or body, a shaft mounted in said receptacle and having a dumping plate secured thereto for normally closing said opening and coöperating means on said shaft and said receptacle preventing the removal of said receptacle while said plate is in other than a dumping position.

3. A mechanism of the character described including in combination a main casing or body having an opening in the upper end thereof, a hopper to discharge articles into said opening, an article receptacle removably mounted in said casing or body, a shaft mounted in said receptacle and having a dumping plate secured thereto for normally closing said opening, said shaft having a flat portion and means on said receptacle adapted to receive said flat portion when the plate is in dumping position and preventing the removal of said receptacle while said plate is in other than a dumping position.

4. A mechanism of the character described including in combination a main casing or body having an opening in the upper end thereof, a hopper to discharge articles into said opening, an article receptacle removably mounted in said casing or body, a shaft mounted in said receptacle and having a dumping plate secured thereto for normally closing said opening, said shaft having a flat portion and an ear on said receptacle having an opening to receive said shaft and having a slot leading into said opening and less in width than said opening and adapted to receive said flat portion when the plate is in dumping position and preventing the removal of said receptacle while said plate is in other than a dumping position.

5. A mechanism of the character described including in combination a main casing or body having an opening in the upper end thereof, a hopper to discharge articles into said opening, an article receptacle removably mounted in said casing or body, a shaft mounted in said receptacle and having a dumping plate secured thereto for normally closing said opening, said shaft having a flat sided portion near each end and an ear on each side of the opening into the receptacle, each ear having an opening to receive said shaft and having a slot leading into said opening and less in width than said opening and adapted to receive said portion when the plate is in dumping position preventing the removal of said receptacle while said plate is in other than a dumping position.

6. A mechanism of the character described including in combination a main casing or body having an opening in the upper end thereof, a hopper to discharge articles into said opening, an article receptacle removably mounted in said casing or body, said receptacle having an opening and a lid therefor hingedly mounted, means for holding the lid open during and releasable upon the complete insertion of the receptacle in the casing, and means for holding the lid open only while the receptacle is in position within the casing.

7. A mechanism of the character described including in combination a main casing or body having an opening in the upper end thereof, a hopper to discharge articles into said opening, an article receptacle removably mounted in said casing or body, said receptacle having an opening and a lid therefor hingedly mounted and having resilient means normally forcing it to its closed position, means for latching the lid in opened position preliminary to the insertion of the receptacle in the casing, other means for rendering the latching means inoperative upon the insertion of the receptacle in the casing, and means preventing the closing of the lid while the receptacle is in position within the casing or body, said means releasing the lid on withdrawal of the receptacle.

8. A mechanism of the character described including in combination a main casing or body having an opening in the upper end thereof, a hopper to discharge articles into said opening, an article receptacle removably mounted in said casing or body, said receptacle having an opening and a lid therefor hingedly mounted and having resilient means normally forcing it to its closed position, means for locking said lid in its extreme open position, means for holding said lid in a partially open position, and means for releasing said locking means when the receptacle is inserted within the casing or body so that the lid engages the holding means and is released when the receptacle is withdrawn therefrom so that the lid closes before withdrawal.

9. A mechanism of the character described including in combination a main casing or body having an opening in the upper end thereof, a hopper to discharge articles into said opening, an article receptacle removably mounted in said casing or body, said receptacle having an opening and a lid therefor hingedly mounted and having resilient means normally forcing it to its closed position, a rod for engaging and locking said lid in its extreme open position, means for holding said lid in a partially open position when within the casing or body, and means for releasing said rod when the receptacle is inserted within the casing or body so that the lid engages the holding means and is released when the receptacle is withdrawn therefrom so that the lid closes before withdrawal.

10. A mechanism of the character described including in combination a main casing or body having an opening in the upper end thereof, a hopper to discharge articles into said opening, an article receptacle removably mounted in said casing or body, said receptacle having an opening and a lid therefor hingedly mounted and having resilient means normally forcing it to its closed position, a rod for engaging and locking said lid in its extreme open position, means for holding said lid in a partially open position when within the casing or body, and means for releasing said rod when the receptacle is inserted within the casing or body, said rod having an extension adapted to be engaged by the casing or body to release the rod from locking engagement with the lid when the receptacle is inserted within the casing or body so that the lid engages the holding means and is released when the receptacle is withdrawn therefrom so that the lid closes before withdrawal.

11. A fare-collecting apparatus comprising a casing, a fare-receiving hopper therefor, a fare-collecting receptacle removably disposed in the casing beneath the hopper and embodying a spring-closed lid, means carried by the casing for holding the lid open when the receptacle is operatively positioned, and trip operated means for holding the lid open during insertion and rendered inoperative upon the complete insertion of the receptacle in the casing.

12. A mechanism of the character described including in combination a main casing or body having an opening in the upper end thereof, a hopper to discharge articles into said opening, said casing or body having a chute depending from the top thereof, an article receptacle removably mounted in said casing or body, said receptacle having an opening within which said chute extends and also having a lid with resilient means normally forcing it to its closed position, means for locking the lid in its extreme open position, said locking means being released when the receptacle is inserted within the casing or body so that the lid engages said chute and is released therefrom to close only when the receptacle is inserted within the casing or body so that the lid engages said chute and is released therefrom to close only when the receptacle is moved outwardly for withdrawal.

13. A mechanism of the character described including in combination a main casing or body having an opening in the upper end thereof, a hopper to discharge articles into said opening, said casing or body having its lower end open and provided with a bottom door with locking means therefor, an article receptacle removably mounted in said casing or body, a dumping plate normally closing said opening and means preventing the removal of said receptacle while said plate is in other than a dumping position including a key part rotatable by the dump plate to lock and unlock the receptacle in the casing.

14. A mechanism of the character described, including in combination a main casing or body having an opening in the upper end thereof, a hopper to discharge articles into said opening, said casing or body having its lower end open and provided with a bottom door with locking means therefor, an article receptacle removably mounted in said casing or body, a dumping plate normally closing said opening and means preventing the removal of said receptacle while said plate is in other than a dumping position, said receptacle having an opening and a lid therefor, means normally tending to close the same, means for latching the lid open when removed from the casing, means for holding said lid open while the receptacle is in receiving position within the casing or body and releasing said lid to close when said receptacle is moved outwardly.

15. A mechanism of the character described including in combination a main casing or body having an opening in the upper end thereof, a hopper to discharge articles into said opening, said casing or body having its lower end open and provided with a bottom door with locking means therefor, an article receptacle removably mounted in said casing or body, a dumping plate normally closing said opening and means preventing the removal of said receptacle while said plate is in other than a dumping position, said receptacle having an opening and a lid therefor, means normally tending to close the same, means for locking said lid open while being applied in position and releasing said lid when the receptacle reaches its receiving position, means for holding said lid open while the receptacle is in receiving position within the casing or body and releasing said lid to close when said receptacle is moved outwardly.

CHARLES H. WOODS.

Copies of this patent may be obtained for five cents each, by addressing the "Commissioner of Patents, Washington, D. C."